United States Patent
Martin et al.

[11] Patent Number: 6,080,311
[45] Date of Patent: *Jun. 27, 2000

[54] FILTER WITH MOLDED END CAP

[75] Inventors: James William Martin, Rehoboth, Mass.; Sunil K. Kesavan, Troy, Mich.; Edmond Hector Cote, Jr., Warren, R.I.

[73] Assignee: AlliedSignal Inc., Morristown, N.J.

[ * ] Notice: This patent is subject to a terminal disclaimer.

[21] Appl. No.: 07/963,158

[22] Filed: Oct. 19, 1992

[51] Int. Cl.$^7$ .................................................. B01D 27/06
[52] U.S. Cl. .......................................... 210/493.2; 55/498
[58] Field of Search .............................. 210/493.1, 493.2, 210/493.5; 156/69, 275.5, 275.7; 55/498

[56] References Cited

U.S. PATENT DOCUMENTS

| | | | |
|---|---|---|---|
| 3,164,506 | 1/1965 | Lake | 210/493.2 |
| 3,170,826 | 2/1965 | Norton et al. | 156/69 |
| 3,224,592 | 12/1965 | Burns et al. | 210/509 |
| 5,028,330 | 7/1991 | Caronia et al. | 210/493.2 |
| 5,128,039 | 7/1992 | Gabrielson | 210/493.5 |

FOREIGN PATENT DOCUMENTS

| | | | |
|---|---|---|---|
| 520386 | 1/1956 | Canada | 210/493.2 |
| 2075771 | 10/1971 | France | |
| 2 134 811 | 8/1984 | United Kingdom | |
| 90 15654 | 12/1990 | WIPO | |

*Primary Examiner*—Matthew O. Savage

[57] ABSTRACT

A filtering element includes a circumferentially extending filter media having a pair of opposite ends. An end cap assembly closes the ends of the filtering media and consists of an annular cup-shaped member defining a circumferentially extending trough. A circumferentially extending band of sealant is dispensed into the trough. The media and the centertube, which supports the inner diameter of the media, is installed in the sealant within the trough. The sealant may be either Plastisol or a photo-initiating polymer. The end cap can be made transparent to ultraviolet light, so that the photo-initiated polymer can be cured by transmitting ultraviolet light through the end cap.

2 Claims, 2 Drawing Sheets

FILTER WITH MOLDED END CAP

This invention relates to liquid filters for filtering the lubricating oil of an internal combustion engine, but it may also be applicable to other types of filters, such as fuel filters and filters used for filtering the combustion air of an internal combustion engine.

Liquid filters for filtering lubricating oil of an internal combustion engine consist of a metal housing with a filter element within the housing. The filter element commonly consists of a circumferentially extending cylindrical array of pleated filter paper. The ends of the filter element are sealed by a sealant commonly known commercially as Plastisol, which is dispensed upon paper or metal end caps. Manufacture of these filter elements presently requires a great deal of hand labor. Commonly, the Plastisol sealant is dispensed upon one of the end caps, the operator then gathers the array of pleated filtering paper and installs it in the Plastisol. The subassembly is then inverted by hand, and a similar process is repeated to apply the opposite end cap to the opposite end of the array of pleated filtering paper. The Plastisol must then be thermally cured.

More recently, in order to speed up production lines, use of an ultraviolet cured sealant has been proposed in U.S. Pat. No. 5,028,330. The ultraviolet cured material is relatively expensive as compared to the inexpensive prior art Plastisol compounds. Accordingly, it is desirable to minimize use of such expensive compounds.

The present invention uses a contoured, molded, end cap which defines a trough into which the sealant compound is dispensed. The trough contains the compound, thereby minimizing the amount required, and also replaces the mold required to form the ultraviolet compound in the prior art device, as the end cap itself acts as the mold. The end cap, according to the present invention, may also be used with the prior art Plastisol compounds. Again, the quantity of the Plastisol is minimal.

This and other advantages of the present invention will become apparent from the following description, with reference to the accompanying drawings, in which.

Figure 1:
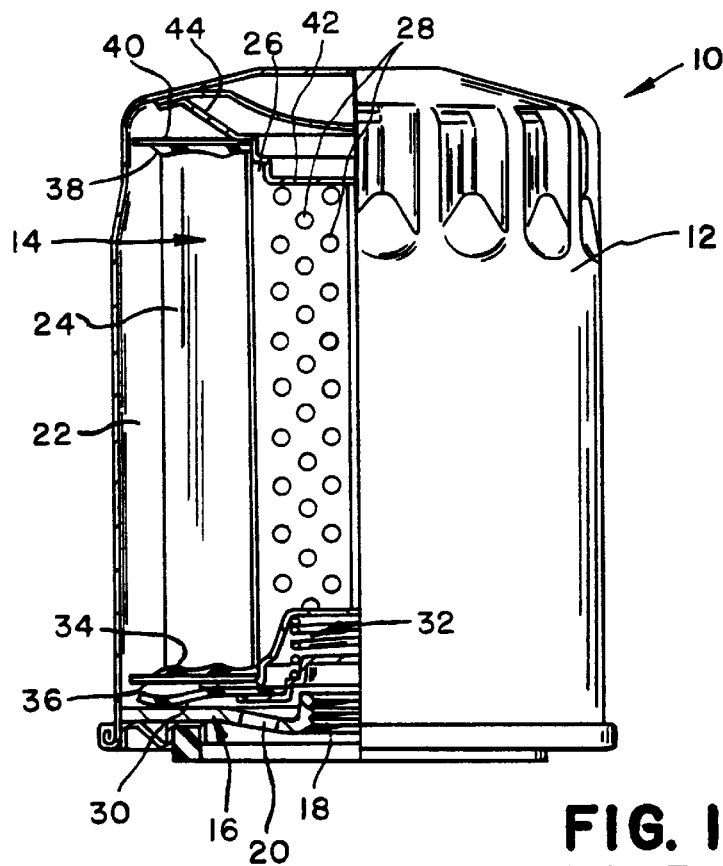
FIG. 1 is a cross-sectional view of an oil filter assembly incorporating a liquid filter made according to the teachings of the prior art.

Referring now to the drawings, a conventional spin-on engine lubricating oil filter is illustrated at 10 in FIG. 1. The filter 10 includes a metal can-shaped housing 12 which defines a cavity therein which receives a filter element generally indicated by the numeral 14. The open end of the metal housing 12 is closed by a tapping plate 16. Tapping plate 16 includes a threaded outlet opening 18, which is adapted to be threaded on a mounting stud (not shown) on a mounting surface of the vehicle engine. Tapping plate 16 further includes circumferentially spaced inlet openings 20 which permit lubricating oil to communicate into an inlet chamber 22 defined between the housing 12 and the outer tips of a conventional cylindrical array of pleated filter paper 24. Inward collapse of the pleated paper array 24 is resisted by a metallic perforated centertube 26 which circumscribes the inner tips of the pleats comprising the array 24. The centertube 26 is substantially cylindrical and defines an outlet chamber communicating with the outlet opening 18. The perforations of the centertube are illustrated as at 28. An anti-drainback valve 30, which prevents lubricating oil from draining out of the chamber 22 back through the inlet openings 16 when the engine is turned off, and a bypass valve generally indicated by the numeral 32, which permits lubricating oil to bypass around the filter element 14 when the pressure across the element 14 reaches an excessive level, is also provided.

The lower end, (viewing FIG. 1) of the array 24 is sealed by a circumferentially extending band of Plastisol generally indicated by the numeral 34 which is carried on a substantially flat, annular end cap 36. The outer periphery of end cap 36 engages the wall of the housing 12 to properly orient the filter element 14 within the housing 12. The upper end of the array 24 is sealed by Plastisol generally indicated by the numeral 38 which is dispensed upon an upper end cap 40 which, like the lower end cap 36, is an annular, substantially flat, paper which extends from the centertube 28 radially outwardly across the top of the array 24. The top of the centertube 26 is sealed by a centertube cap 42 of conventional design which incorporates a leaf spring 44 which engages the end of the housing 12, thereby loading the filter element downwardly, viewing the Figure.

Figure 4:
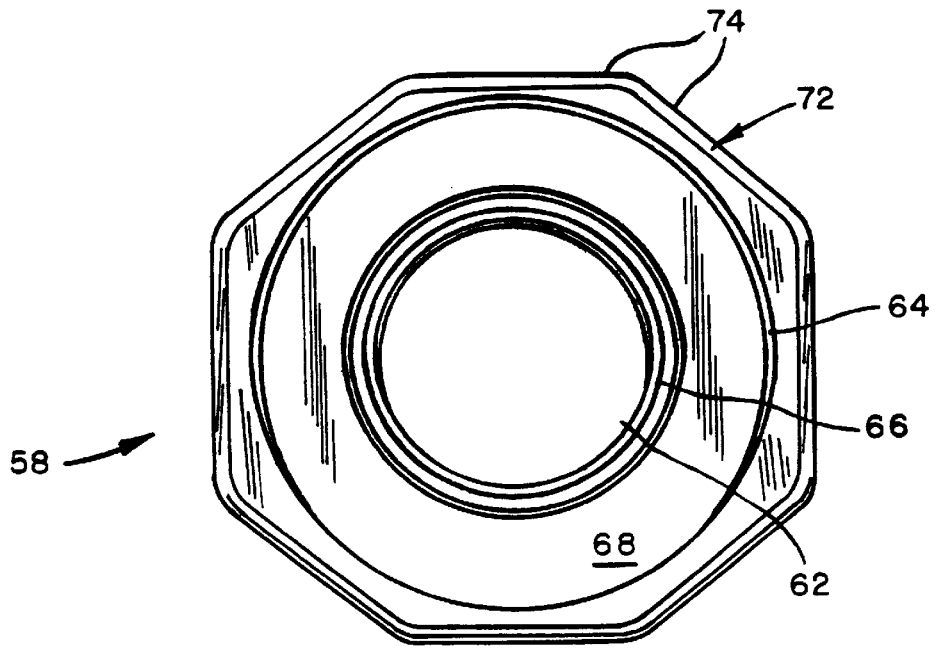
FIG. 4 is a perspective view of the end cap used in the filter element illustrated in FIGS. 2–3.
Figure 2:
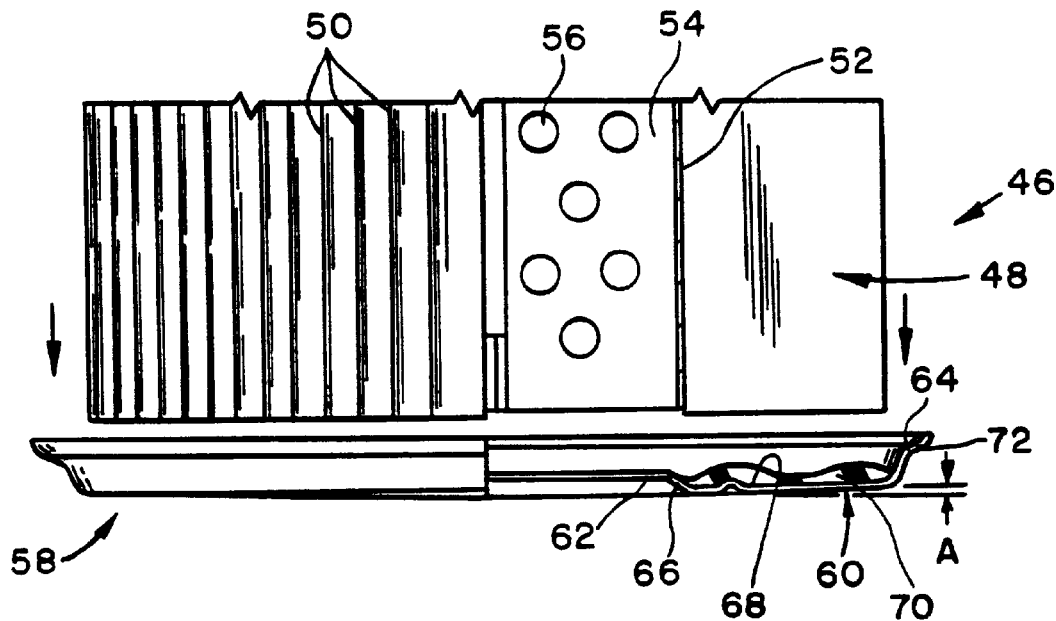
FIG. 2 is a view, partly in section, of a filter element used in the liquid filter of FIG. 1, with the parts thereof shown in their relative positions just before the end of the filter element is forced into the end cap.
Figure 3:
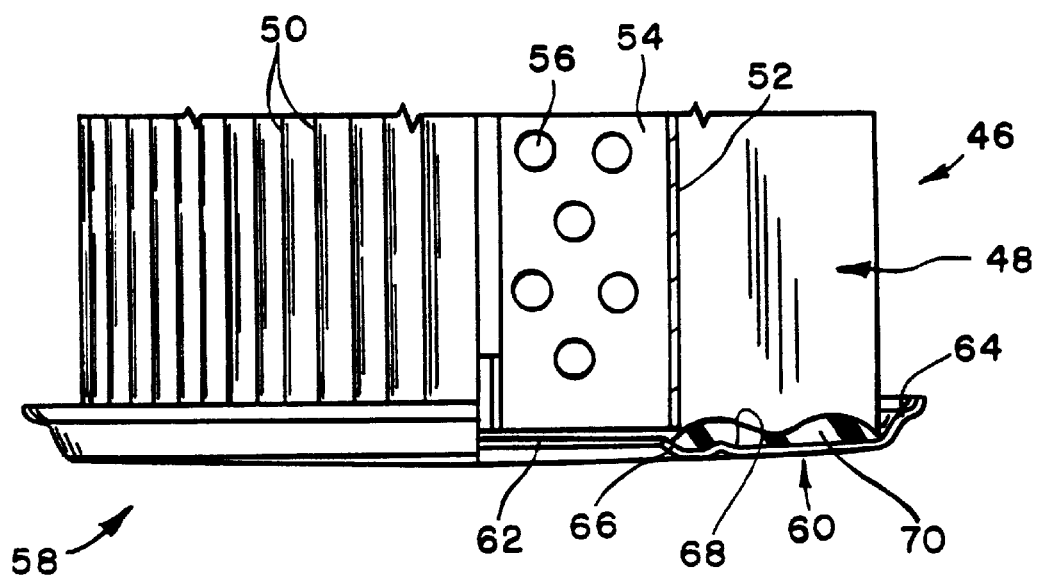
FIG. 3 is a view similar to FIG. 2, but illustrating the completed filter element assembly.

Referring now to FIGS. 2–4, a filter element 46 is made according to the invention and replaces the filter element 14 of FIG. 1. Filter element 46, as does filter element 14, consists of a circumferentially extending, cylindrical array of radially tapering pleats generally indicated at 48. Each of the pleats tapers radially from an outer tip 50 to corresponding inner tips 52. A metallic centertube 54 includes perforations as at 56 and extends circumferentially about the inner tips 52 and resists inward collapse of the array 48.

The ends of the array 48 are sealed by an end cap assembly indicated by the numeral 58. End cap assembly 58 consists of a resilient, substantially rigid annular cup-shaped member generally indicated by the numeral 60. The cup-shaped member 60 circumscribes an opening 62 which is coaxial with the centertube 52. The cup-shaped member 60 extends between a circumferentially extending, axially projecting outer lip 64 and a circumferentially extending, axially tapering inner lip 66. Lips 64, 66 cooperate with one another to define a circumferentially extending trough 68 therebetween. A circumferentially extending band of sealant material, generally indicated by the numeral 70, is dispensed into the trough 68. The sealant material 70 may either be of the conventional Plastisol compound discussed hereinabove, or, as also discussed hereinabove, may be a polymer material that is cured by ultraviolet radiation. The ultraviolet compound is commercially available from several sources, and may be Ciba-Geigy compound XMH-8744. This compound is substantially clear, and cures in a time period of 2–3 seconds when exposed to ultraviolet light.

The trough 68 is wide enough to receive the entire width of the array 48 and also wide enough to receive the centertube, such that the sealing compound 70 seals the end of the pleats and also seals the centertube against the end of the pleats and against the end cap assembly 58. It will also be noted that the cup-shaped member 66 tapers in the axial direction from the opening 62 toward the outer lip 64 by an angle represented by the angle A in FIG. 2. The cup-shaped member 60 is sufficiently resilient that it is deflectable axially through the angle A as the array 48 and centertube 52 are installed into the trough 68, so that the resiliency of the cup-shaped member 60 loads the sealant into the pleats as the cup-shaped member 60 is deflected through the angle A as the array 48 and centertube 52 are installed into the trough 68 by urging the array 48 and centertube 52 downwardly, viewing FIG. 2. This can be accomplished by, for example, grasping the array and forcing it downwardly, either manually or by using a assembly equipment such as a dial index machine including grasping arms that grasp the array and force it downward, as disclosed in the above-mentioned U.S. Pat. No. 5,028,330. The outer circumferential edge 72, which projects radially outwardly from the lip 64, terminates in flats 74 which properly orient the filter element 46 when it is installed in the metal housing 12.

The cup-shaped member 60 consists of a randomly distributed, non-woven array of fibers and a binder resin and is manufactured by conventional paper making processes well known to those skilled in the art. The bulk of the fibers, to minimize cost, are normally cellulose fibers, but at least some of the fibers are desirably synthetic fibers, such as polyester fibers, or inorganic fibers, such as glass fibers, in order to give tensile and flex fatigue strength and to also give resiliency and formability. It is also necessary to use a binder resin such as a phenolic, latex, acrylic, epoxy, or polyvinyl alcohol. A typical material would comprise from 50–90% cellulose fibers, 5–20% synthetic fibers, with the remainder resin. The resin provides flexibility to the article, to permit the trough to be formed by molding or other forming processes. If a Plastisol sealant is to be used, the fiber mixture and resin can be chosen to minimize cost. However, if an ultraviolet cured polymer is used as a sealant, the resin and fiber mixture must be carefully chosen, since each resin and fiber absorbs, reflects, and transmits radiation at different frequencies. It has been found that polyvinyl alcohol resin transmits a substantially greater percentage of the ultraviolet wavelengths and is the preferred resin if an ultraviolet initiated polymer is to be used as a sealant. Suitable materials are available from the Custom Papers Group of James River Corporation. All percentages given in the aforegoing discussion are percentages by weight. The end cap is made transparent to ultraviolet light if an ultraviolet cured sealant is used so that the photo-initiated polymer can be cured by transmitting ultraviolet light through the end cap. Ideally, the filter element is manufactured as described in the above-referenced U.S. Pat. No. 5,028,330, where the end cap assembly 58 is carried on glass trays to permit ultraviolet light to be transmitted through the tray and the end cap to cure the sealant.

We claim:

1. Filter element comprising a circumferentially extending filtering media formed into a substantially cylindrical, annular shape having a pair of opposite ends defined by the ends of the cylinder, and a pair of end cap assemblies for closing and sealing corresponding ends of the media, at least one of said end cap assemblies comprising a cup-shaped annular member defining a circumferentially extending trough receiving the corresponding end of the media, a circumferentially extending band of a photo-initiated polymer dispensed in said trough and sealingly engaging the corresponding end of the media when said end is received in said trough to provide a seal between the end of the media and the cup-shaped annular member, said cup-shaped annular member being made of a material that is transparent to light so that said polymer can be cured after the media is installed into said cup-shaped member by transmitting light through the cup-shaped member, said end cap being made of a mixture of cellulose fibers and synthetic and/or inorganic fibers, and a binder resin.

2. Filter element comprising a circumferentially extending filtering media formed into a substantially cylindrical, annular shape having a pair of opposite ends defined by the ends of the cylinder, and a pair of end cap assemblies for closing and sealing corresponding ends of the media, at least one of said end cap assemblies comprising a cup-shaped annular member defining a circumferentially extending trough receiving the corresponding end of the media, a circumferentially extending band of a photo-initiated polymer dispensed in said trough and sealingly engaging the corresponding end of the media when said end is received in said trough to provide a seal between the end of the media and the cup-shaped annular member, said cup-shaped annular member being made of a material that is transparent to light so that said polymer can be cured after the media is installed into said cup-shaped member by transmitting light through the cup-shaped member, said cup-shaped member being a resilient, substantially rigid annular member circumscribing an opening having an axis, said cup-shaped member tapering axially in the direction from said opening and being deflectable axially when the corresponding end of the media is installed in said trough whereby the resiliency of the cup-shaped member exerts a biasing force against the ends of the pleats forcing the sealant into said pleats.

* * * * *